United States Patent [19]

Okada

[11] Patent Number: 5,001,504
[45] Date of Patent: Mar. 19, 1991

[54] FRAME SHOOTING DEVICE FOR CAMERA FOR SHOOTING A PLURALITY OF FRAMES SIMULTANEOUSLY

[75] Inventor: Kihachiro Okada, Tokyo, Japan

[73] Assignee: Asanuma Camera Mechanical Laboratory & Company Ltd., Tokyo, Japan

[21] Appl. No.: 441,485

[22] Filed: Nov. 27, 1989

[51] Int. Cl.$^5$ .............................................. G03B 41/00
[52] U.S. Cl. .................................................. 354/118
[58] Field of Search ........................ 354/118, 120, 125

[56] References Cited

U.S. PATENT DOCUMENTS 4,751,537  6/1988  Saita .................................... 354/118

Primary Examiner—Michael L. Gellner
Attorney, Agent, or Firm—Schwartz & Weinrieb

[57] ABSTRACT

A frame shooting device for a camera for shooting a plurality of frames simultaneously wherein an even number of lenses are arranged in parallel, and four frames are shot simultaneously, whereby not only the simultaneous shooting of all of the frames but also partial shooting of one or two frames can be made by means of a simple mechanism.

4 Claims, 6 Drawing Sheets

FIG. 2

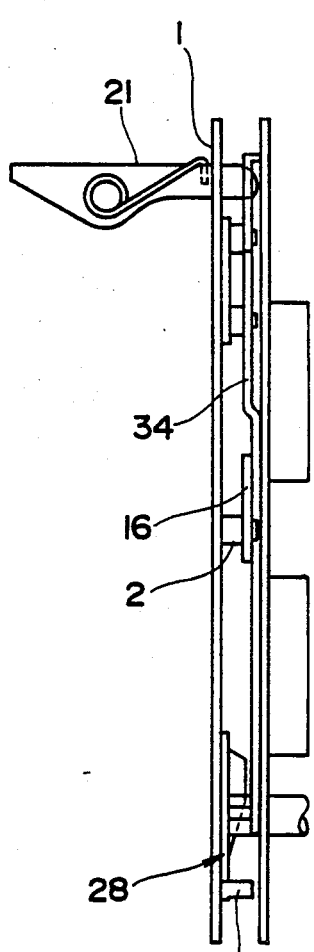
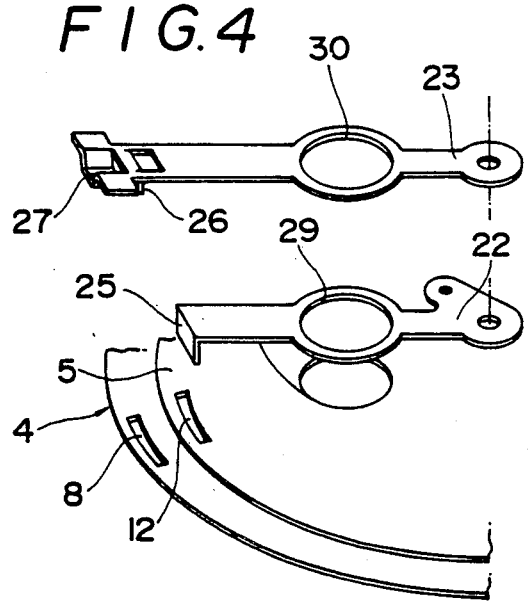
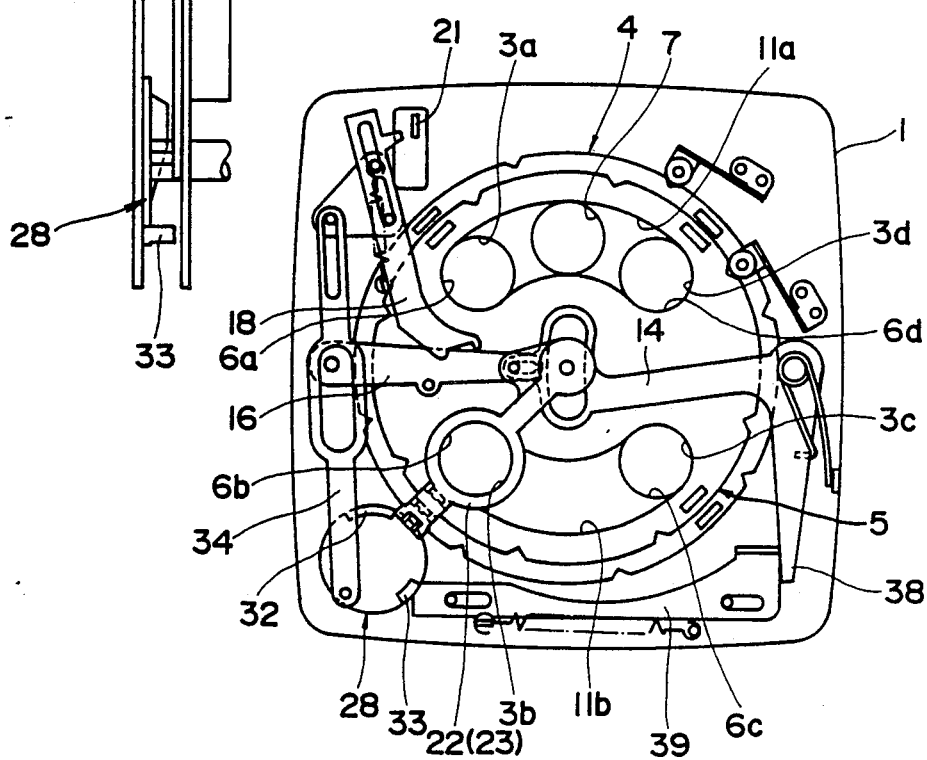

FRAME SHOOTING DEVICE FOR CAMERA FOR SHOOTING A PLURALITY OF FRAMES SIMULTANEOUSLY

FIELD OF THE INVENTION

This invention relates to a frame shooting device for a camera for shooting a plurality of frames simultaneously wherein an even number of lenses are arranged in a parallel mode with respect to each other and four frames are shot simultaneously, whereby not only the simultaneous shooting of the entire frames but also, the partial shooting of one or two frames can be achieved by means of a simple mechanism.

BACKGROUND OF THE INVENTION

In a camera for shooting four frames simultaneously, a frame shooting device is provided for not only the simultaneous shooting of entire frames but also for the partial shooting of one frame or two frames. Heretofore, as a the frame shooting device of this kind, as shown in FIG. 8, an opposite angle light shielding plate 52 is provided which has a rotary shaft 51 rotatable through means of a predetermined angle relative to perforations 50a, 50b, 50c, 50d respectively at the position of the optical axis of each lens which are provided at a first shooting position through a fourth shooting position, in connection with which the perforations (50a, 50c or 50b and 50d) of the opposite angle positions are simultaneously closed, and an independent light shielding plate 53 is provided so as to be rotatably disposed independently with respect to plate 52 at a position of the rotary shaft 51 so as to selectively close one of the perforations 50a, 50b, 50c, 50d is and both the light shielding plates 52 and 53 are reciprocably pivoted or intermittently rotated so as to produce the condition of a one frame aperture, a two frame aperture or entire frame aperture.

However, in the case of the one frame aperture or the two frame aperture, it is necessary to shift the aperture position for each shooting, but, in the frame shooting device of the foregoing construction, the necessary transfer mechanism for shifting and displacing both the light shielding plates 52, 53 at a predetermined angle and in the predetermined direction becomes complicated, and a number of component parts is increased which results in manufacturing, cost, and functional or operational problems.

OBJECT OF THE INVENTION

This invention has been conceived in order to solve the foregoing problems, and its object is to provide a frame shooting device for a camera for shooting a plurality of frames simultaneously having a simple construction and a minimum number of component parts.

SUMMARY OF THE INVENTION

The gist of the frame shooting device in the camera for shooting a plurality of frames simultaneously according to this invention comprises a support plate disposed in the vicinity of a shutter and an iris mechanism in the box of the camera for shooting a plurality of frames simultaneously and four perforations are bored at an interval of 90° when considered as starting at a position of 45° respectively with respect to a horizontal axis and around a pin shaft erected in the center; a plate of the plate for one frame which is rotatably journalled upon a pin shaft of the support plate at its shaft hole and four perforations for shooting four frames simultaneously are bored at positions corresponding to the four perforations of the support plate at angles of 45° relative to the shaft hole and the horizontal axis and a perforation for shooting one frame is bored at a middle position between two of the perforations, and also four feed claw engaging holes are bored at equal intervals in the vicinity of the peripheral edge portion of the plate; a plate for two frames which comprises a disc of smaller diameter than the plate for one frame is rotatably journalled upon the pin shaft of the support plate and a pair of symmetrical arc-shaped elongated holes are bored relative to the shaft hole such that a pair of adjacent perforations within the support plate are positionally aligned with respect to the elongated holes so as to define hole ends therefore and are symmetrical with respect to the shaft hole so as to define an arcuate locus about the shaft hole and four feed claw engaging holes are bored at equal intervals in the vicinity of the peripheral edge portion of the plate; a selective disc rotatably journalled in the vicinity of outer peripheries of both plates at a corner of the support plate is rotated and displaced by interlockingly engaging a frame changeover cam provided outside of the box of the camera, and a cam projection and an abutting projection are formed on a part of the surface of the peripheral portion of the disc, a plate feeding means superposing and fixing base ends of a plate like member of a claw member for two frame feed and a claw member for one frame feed are interlocked with the stroke of the shutter of the camera, and a proper link mechanism and the base ends are rotatably journalled relative to the pin shaft and are pivotable within a maximum angular range of 90° beyond the position of the selective disc, and a two frame feed claw for engaging a feed claw engaging hole of the plate for two frames is provided at the tip of the claw member for two frame feed and also, a one frame feed claw for engaging one of the feed claw engaging holes of the plate for two frames is provided at the tip of the claw member for providing one frame feed, and a riding over end is extended toward the tip of the claw member for one frame feed, producing the condition of an interference or non-interference with the cam projection of the selective disc, and during the interference time, the one frame feed claw is caused to retreat from the feed claw engaging hole; and a control link means which interrupts an interlocking of the link mechanism and the shutter and both claw members by means of the rotation of the selective disc, at the time of shooting of four frames, and controls the pivoting stroke of both claw members.

According to this construction, the number of component parts of the device can be reduced by means of interlocking plate feeding means, if necessary, a control link means for interrupting the interlocking of the link mechanism, shutter and both claw members and by controlling the pivoting stroke of both claw members by means of a cam projection rotated by means of a shooting frame selection knob. Also, each shooting of one frame shooting, two frame shooting and four frame shooting can be performed as a result of interlocking the shutter with the rotary setting of the selective disc.

BRIEF DESCRIPTION OF THE DRAWINGS

These and other objects and advantages of the invention will appear more clearly from the following specification in connection with the accompanying drawings, in which like reference characters designate like or corresponding parts throughout the several views, and wherein

FIG. 2 is an elevation view of the device of FIG. 1;

FIG. 3 is a left side view of the device of FIG. 1;

FIG. 4 is an exploded perspective view of an essential part of the device showing the relationship of the claw member of the frame feed and a plate for the frame;

FIG. 5 is the explanatory drawing showing an operation during the time of four frame shooting;

DESCRIPTION OF THE PREFERRED EMBODIMENTS

An embodiment of the frame shooting device for a camera for shooting a plurality of frames simultaneously according to this invention will be described in the following description by referring to FIG. 1 through FIG. 4.

Figure 1:
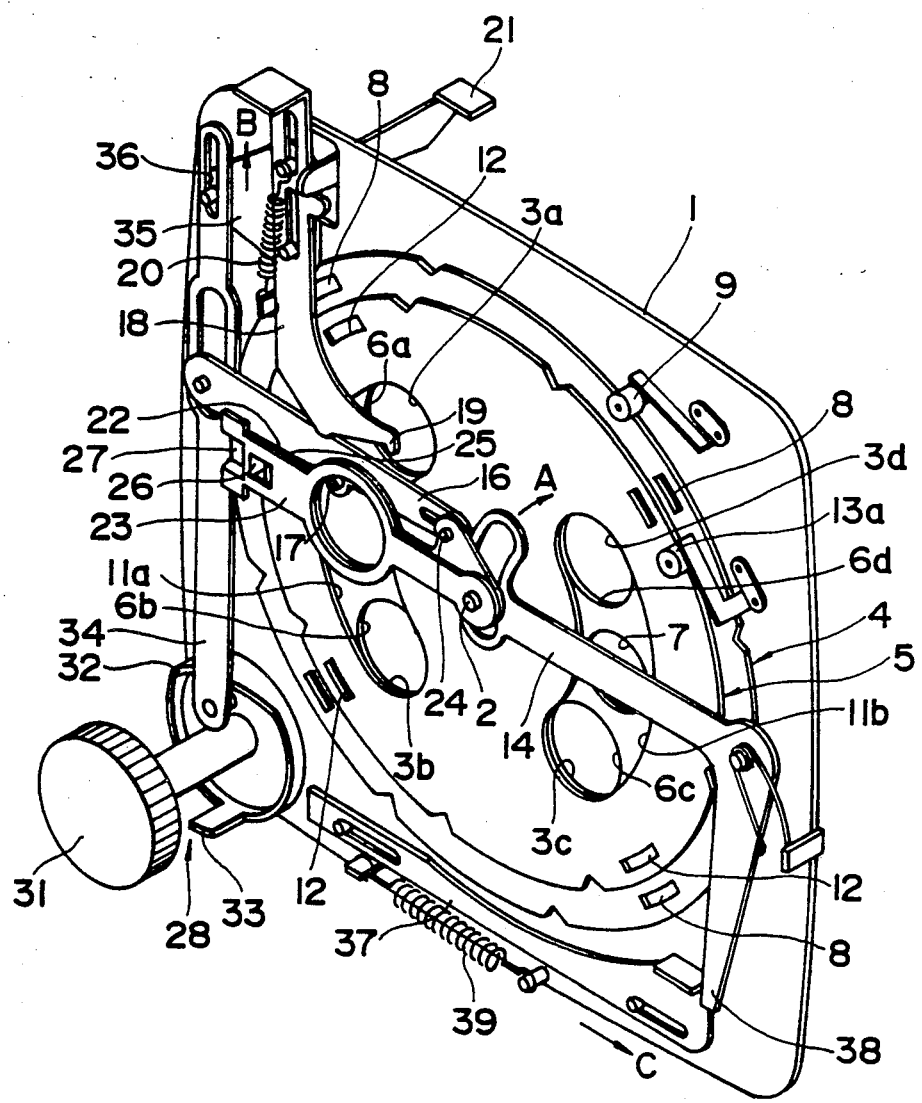
FIG. 1 is a perspective view, partially cut-away showing an embodiment of a frame shooting device for a camera for shooting a plurality of frames simultaneously according to this invention.

FIG. 1 is a perspective view, partially cut-away showing the entire construction of a frame shooting device, and reference numeral 1 denotes a support plate of substantially rectangular shape for a frame shooting device which is disposed within the vicinity of a shutter and an iris mechanism in the box of the camera for shooting a plurality of frames simultaneously, and around a pin shaft disposed at in the center of the support plate 1, four perforations 3a, 3b, 3c, 3d centering an optical axial position of each lens provided at a first shooting position through a fourth shooting position are bored, and a plate 4 for shooting one frame and a plate 5 for shooting two frames which are of the disc type and are rotatable about the pin shaft 2 through means of their shaft holes bored at the centers thereof are placed on top of the support plate 1. Within the plate 4 for one frame, four perforations 6a, 6b, 6c, 6d for shooting four frames simultaneously are bored at positions having an interval of 90° beginning at an angular position of 45° with respect to the horizontal as viewed in the Figure and corresponding to the perforations 3a, 3b, 3c, 3d of the support plate which are respectively at the same 45° offset positions relative to the shaft hole, and also, a perforation 7 for shooting one frame is bored at a middle position between the perforations 6c and 6d and feed claw engaging holes 8, 8 . . . are bored at positions corresponding to the perforations 6a, 6b, 6c, 6d in the vicinity of the peripheral edge portion of the plate 4, and on the peripheral edge, positioning notches 10, 10 . . . for resiliently engaging a click engaging member 9 which is fixed to the support plate 1 are formed at equal intervals corresponding to apertures 6a–6d. Also, on the plate 5 for two frames, a pair of symmetrical arc-shaped elongated holes 11a, 11b relative to the shaft hole are bored, plate 5 being of smaller diameter than the plate 4 for one frame, and the long hole 11a is aligned with the perforations 3a, 3b in the support plate 1 which serve as hole ends, and the long hole 11b is aligned with the perforations 3c, 3d in the support plate 1 which serve as hole ends, and both the holes are formed in an arc-shape centered about the shaft hole, and the feed claw engaging holes 12, 12 . . . are bored at 45° positions in the vicinity of the peripheral edge portion, and upon the peripheral edge, positioning notches 13, 13 . . . are formed at equal intervals so as to resiliently engage a click engaging member 13a which is fixed to the support plate, notches 13 being defined at the eight equally spaced positions.

Figure 2:
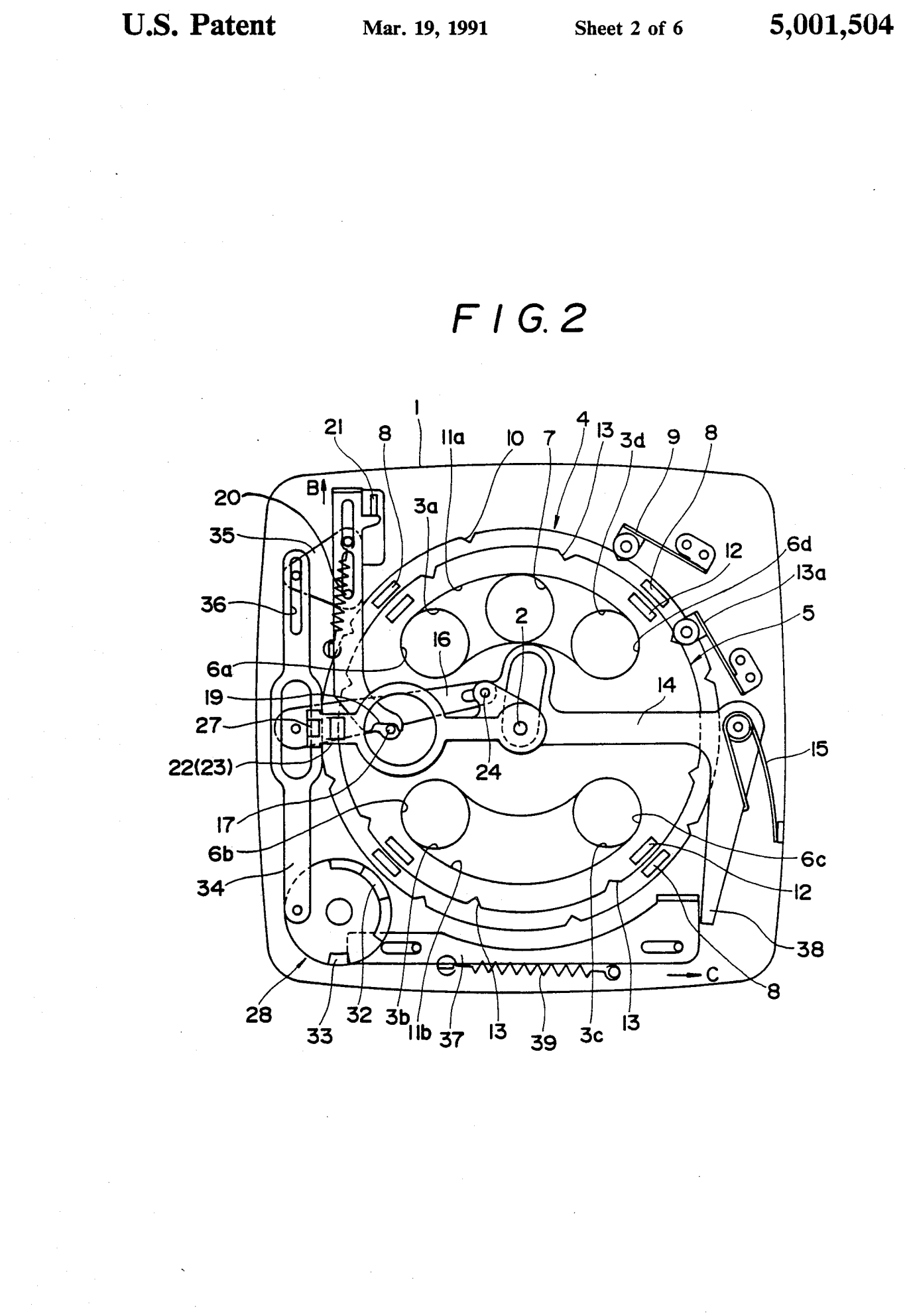

Reference numeral 14 denotes a return lever pivotally fixed to one end of the support plate 1 at the 3 o'clock position so as to be pivotable, and its pivotable end is resiliently so as to return the same in the upper direction (arrow mark A) as seen in FIG. 1 under the influence of a spring 15, as seen in FIG. 2 and the pivotable end is interlocked with a pivotable end of a connecting lever 16 which has whose one end journalled at the 9 o'clock position of the support plate, and thus, the displacement takes place vertically in a predetermined range. The connecting lever 16 engages with or disengages from an engaging end 19 of a feed lever 18 interlocking an engaging projection 17 formed in the middle of the lever by means of a release lever (not shown in the drawing) of the shutter, and an interlocking lever 21, and the feed lever 18 is pivotally provided so as to resiliently return resiliently in the upper direction (arrow mark B) as shown in FIG. 2 by means of a spring 20, and its upper end portion engages or releases the interlocking lever 21, and the engaging end 19 is displaced to a position abutting the engaging projection 17. To the pin shaft 2, a base end of a claw member 22 for two frame feed and a base end of a claw member 23 for one frame feed are fixed, the other end portions are separably superposed in the axial direction and the base ends are rotatably journalled, and the vicinity of the base ends and the swivel end of the connecting lever 16 are connected by means of a pin hinge 24. A two frame feed claw 25, as seen in FIG. 4, formed by bending the tip of the claw member 22 for two frame feed is made to engage an appropriate one of the feed claw engaging holes 12, and similarly a one frame feed claw 26 formed by bending the tip of the claw member 23 for one frame feed is made to engage one of the feed claw engaging holes 8, and a riding end 27 provided at the base end of the claw member 23 for one frame feed can extend toward a selective disc 28. By the way, reference numerals 29 and 30 denote perforations for optical axes formed upon both of the claw members 22, 23. The selective disc 28 is rotatably journalled at a lower left corner of the support plate 1, and is rotatably displaced by means of a frame changeover knob 31 provided outside of the box (not shown in the drawing) of the camera, and a cam projection 32 and an abutting projection 33 are disposed upon part of the peripheral surface of the disc. The cam projection 32 engages the riding end 27 of the claw member 23 for one frame feed, and the member is caused to retreat from the plate 4 for one frame so as to extract the one frame feed claw 26 from one of the feed claw engaging holes 8. Also, the selective disc 28 is connected to the tip of a connecting plate 35 formed upon the upper end portion of the feed lever 18 by means of a crank connecting lever 34 through means of an elongated hole 36 extending in the vertical direction, and the feed lever 18 is tilted at the time of shooting the four frames simultaneously so as to engage with or release the interlocking lever 21. Moreover, the abutting projection 33 of the selective disc 28 is slidably disposed in the transverse direction relative to the support plate 1, and abuts upon an operating end portion 38, which has a substantially L-shaped configuration and extends from the base end portion of the return lever 14, by means of a slide interlocking lever 37 resiliently energized in the direction of the arrow mark C by means of a spring 39 at the time of shooting the four frame so as to block the displacement of the return lever 14.

Next, the operation of the frame shooting device for a camera for shooting a plurality of frames simultaneously having the foregoing construction will be described.

FIG. 5 shows the case of shooting four frames, and when the shooting frame selective or changeover knob 31 is turned to a "four frame" position, the selective disc 28 is rotated, and the abutting projection 33 moves the operating end portion 38 of the return lever 14 by means of the slide connecting lever 37, and the return lever 14 is retained at the neutral position so as to shift both the claw members 22, 23 to the position of the perforation 3b bored at the second shooting position of the support plate 1, and the crank connecting lever 34 is pulled so as to tilt the feed lever 18, whereby the engaging end 19 of the feed lever 18 is displaced to a position removed from the engaging projection 17 of the connecting lever 16. In this condition, the positions of the support plate perforations 3a, 3b, 3c, 3d are superposed with the perforations 6a, 6b, 6c, 6d for simultaneous shooting of four frames of the plate 4 for one frame and the arc-shaped elongated holes 11a, 11b of the plate 5 for two frames and also, the full shooting positions are open since the perforations 29, 30 for the optical axes of both the feed claw members 22, 23 are superposed with the perforation 3b, and the four frames are simultaneously shot. Also, since the feed lever 18 is separated from the interlocking lever 21, the stroke movement of the interlocking lever 21 is not propagated when the shutter of the camera is released.

Figure 6A:
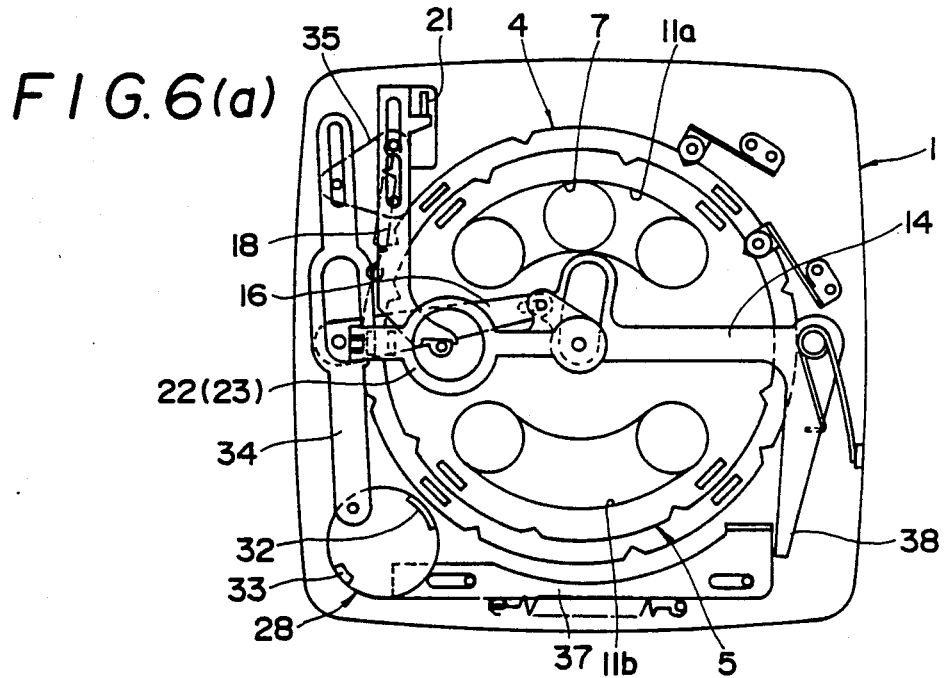
FIG. 6 is an explanatory drawing showing the device components before operation (a) and after operation (b) with respect to a description of the operation during the time of shooting two frames.

Also, FIG. 6 shows the description of operation of the two frame shooting, and shows the before operation (a) and the after operation (b).

Figure 6B:
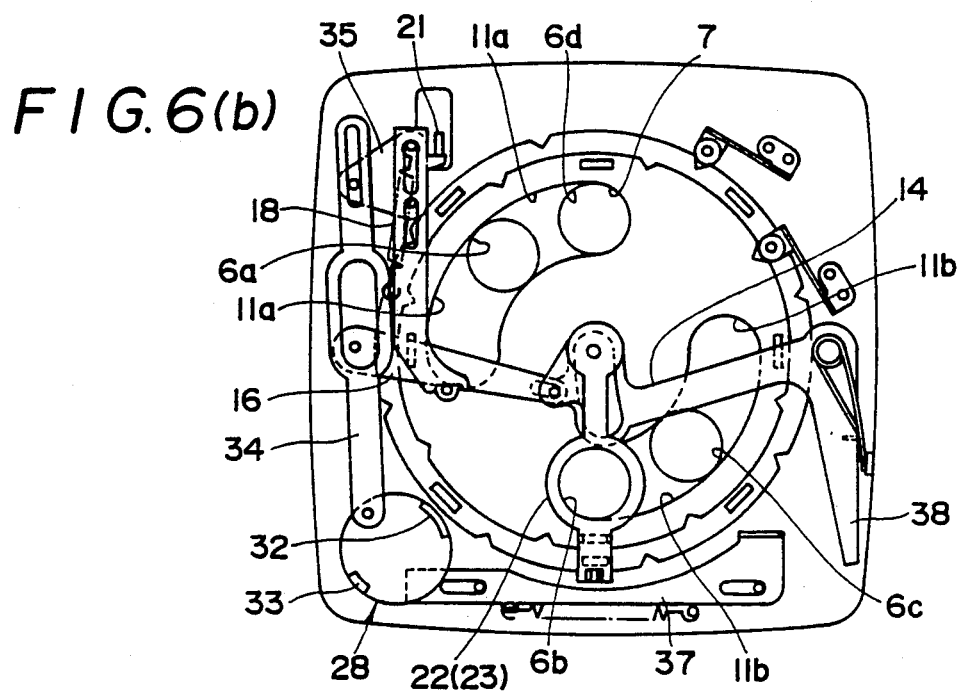

When the shooting frame selective or changeover knob 31 is rotated to the "two frames" position, the selective disc 28 is rotated, and the abutting projection 33 retreats from the slide interlocking lever 37, and the return lever 14 undergoes pivoting motion through the full pivoting range, and the displacement in the direction of arrow mark A takes place so as to allow both the claw members 22, 23 to standby at a middle position between the first shooting position and the second shooting position of the support plate 1. Also, since the crank connecting lever 34 is released from the pulling position of FIG. 5, the feed lever 18 is engaged with the interlocking lever 21, and the engaging end 19 of lever 18 assumes its opposing position with respect to the engaging projection 17 of the connecting lever 16. When the shutter is actuated in this condition, the feed lever 18 is pressed downwardly by means of the interlocking lever 21 and the connecting lever 16 is pressed downwardly against the resistance of the return lever 14 and the spring 15 so that both the claw members 22, 23 as shown in FIG. 6(b) are rotated to the 6 o'clock position through a displacement of 90°. The frame feed claws 25, 26 of both the claw members 22, 23 slidably shift upon the surfaces of the plate 4 for one frame and the plate 5 for two frames as a result of such displacement, but when passing or moving with respect to the feed claw engaging holes 8, 12 of both the plates 4, 5, the riding end 27 of the feed claw member 23 for one frame encounters the cam projection 32 of the selective disc 28 so that only a feed claw engaging hole 12 of the plate 5 for two frames engages the two frame feed claw 25, and only the plate 5 for two frames is rotated 45° and displaced. In this condition, the positions of the perforations or apertures 3b, 3d of the support plate 1 are interrupted by means of the plate 5 for one frame, and since the perforations 6a, 6c for simultaneously shooting four frames of the plate 4 for one frame are at the positions of the perforations 3a, 3c of the support plate 1 as they are superposed upon the arc-shaped elongated holes 11a, 11b of the plate 5 for two frames, the first and the third shooting positions are open, and the combination of one of the two frames is simultaneously shot. When the shutter is released, both of the claw members 22, 23 are rotated and displaced 90° in the clockwise direction by means of the returning operation of the spring 15 of the return lever 14, and as a feed claw engaging hole 12 of the plate 5 for two frames and the two frame feed claw 25 are engaged, the plate 5 for two frames is rotated and displaced. In this condition, the positions of the perforations or apertures 3a, 3b of the support plate 1 are interrupted by means of the plate 5 for two frames, and the perforations 6b, 6d for simultaneously shooting four frames of the plate 4 for one frame are superposed upon the arc-shaped elongated holes 11b, 11d of the plate 5 for two frames, and are at the positions of the perforations 3b, 3d of the support plate 1 whereby the second and the fourth shooting positions are open, and the remaining combination among the two frames is simultaneously shot.

Figure 7A:
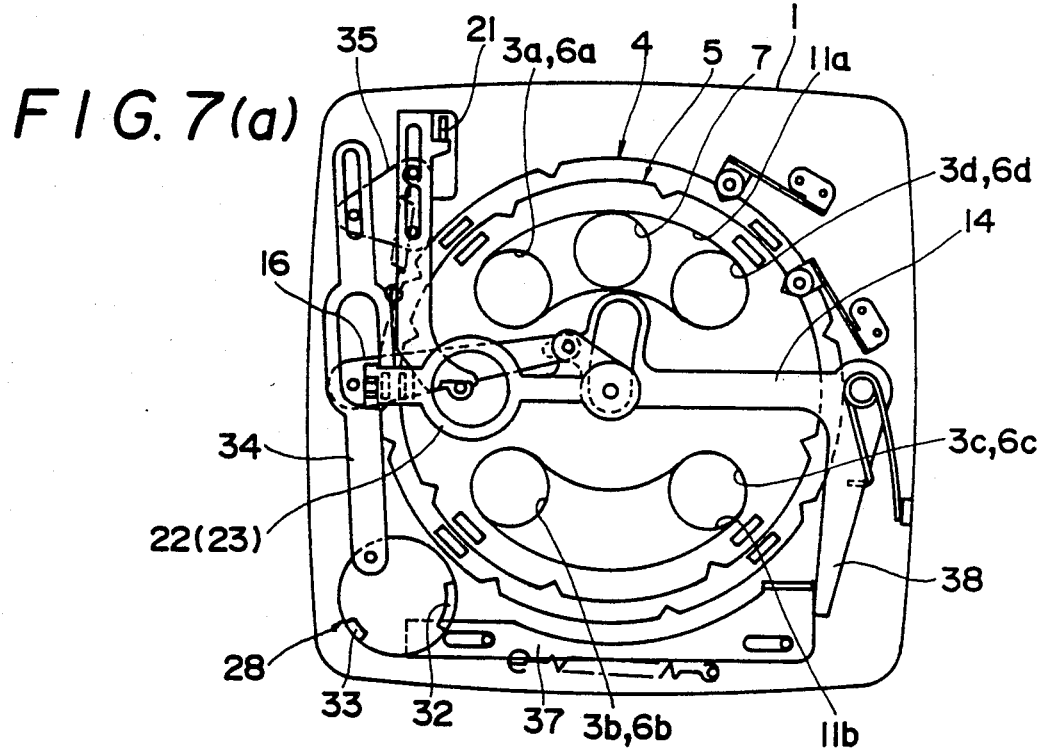
FIG. 7 is an explanatory drawing showing the device components before operation (a) and after operation (b) with respect to a description of the operation during the time of shooting one frame.

Moreover, FIG. 7 illustrates the operation at the time of one frame shooting, and shows the before operation (a) and the after operation (b).

Figure 7B:
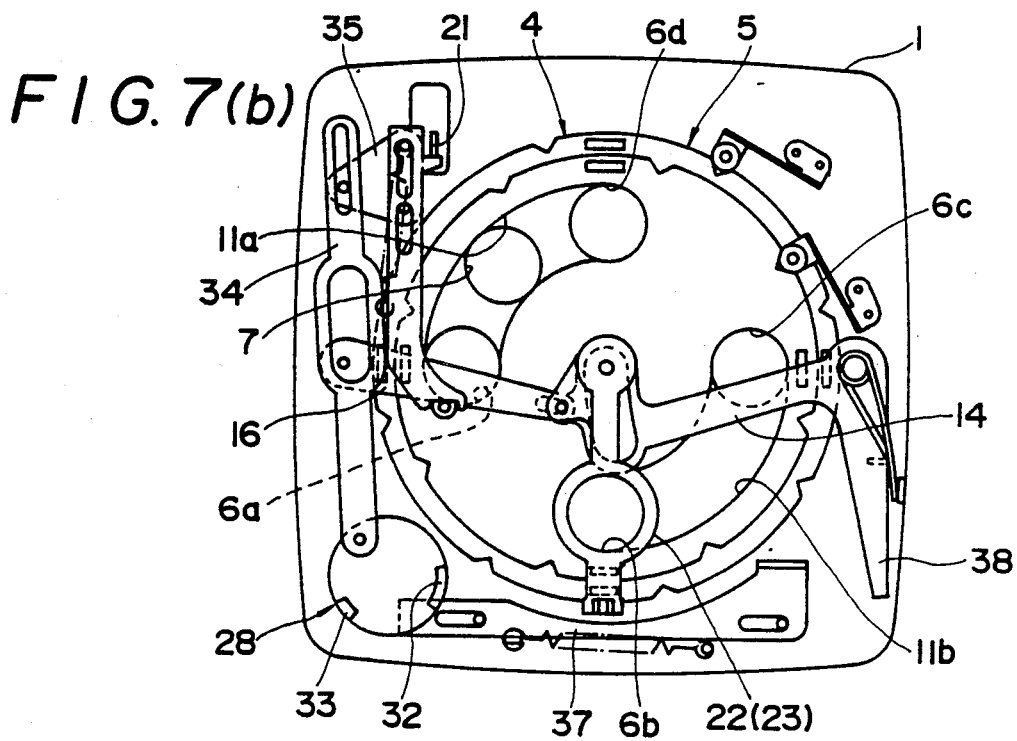
Figure 8:
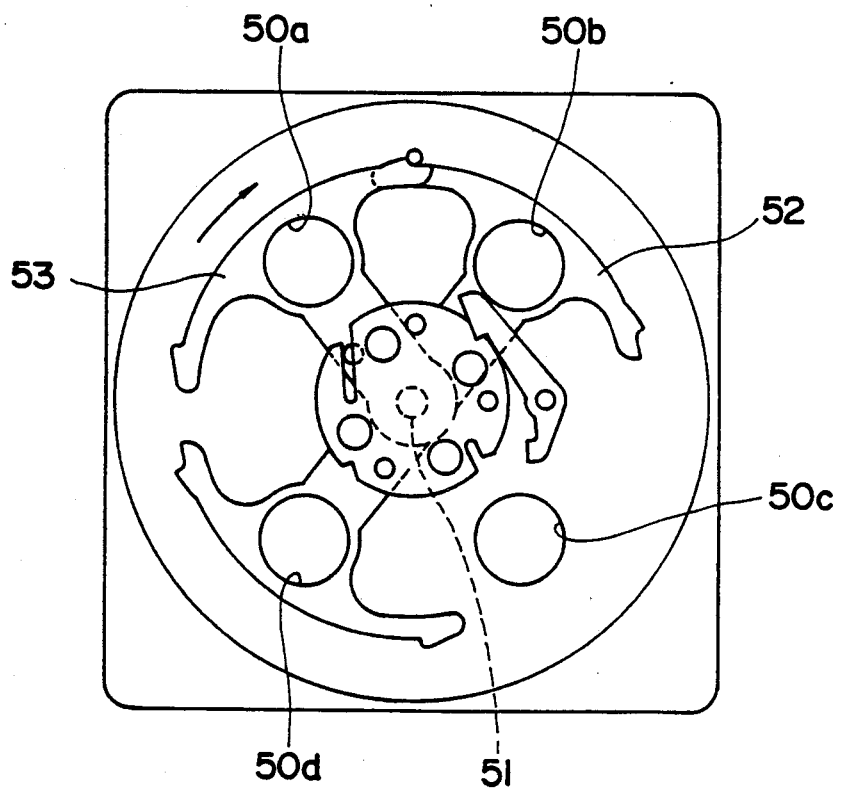
FIG. 8 is an elevation view showing a frame shooting device in a conventional camera.

When the shooting frame selective or changeover knob 31 is rotated to the "one frame" position, the selective disc 28 is rotated, and the abutting projection 33 retreats from the slide connecting lever 37, and the return lever 14 is allowed to pivotable through the entire pivoting range, and the displacement takes place in the direction of the arrow mark A under the influence of the spring 15, and both the claw members 22, 23 are allowed to standby at a middle position between the first shooting position and the second shooting position of the support plate. The crank connecting lever 34 is released from the pulling position of FIG. 5, and the feed lever 18 engages the interlocking lever 21, whereby the engaging end 19 of lever 18 is disposed at opposing position with respect to the engaging projection 17 of the connecting lever 16 so as to produce a condition similar to the one occurring at the time of shooting "two frames" but the position of the cam projection 32 of the selective disc 28 retreats from that of the two frame position. From this condition, when the shutter is released, the feed lever 18 is pressed downwardly by means of the interlocking lever 21, and the connecting lever 16 is pressed downwardly against the resistance of the return lever 14 and the spring 15 so that both the claw members 22, 23 are displaced 90° as shown in FIG. 7(b) and are rotated to the 6 o'clock position. With this displacement, the feed claws 25, 26 of both the claw members 22, 23 slidably shift upon the surfaces of the plate 4 for one frame and the plate 5 for two frames, and when they pass over the feed claw engaging holes 8, 12 of both the plates 4, 5, the frame feed claws 25 and 26 of the feed claw members 22, 23 engage the feed claw engaging holes 8, 12 of both the plates 4, 5, and both the plates 4, 5 are rotated 45° and displaced. In this condition, the positions of the perforations 3b, 3d of the support plate 1 are interrupted by means of the plate 5 for two frames, and the position of the perforation 3c of the support plate 1 is interrupted by means of the plate 4 for one frame, and the perforation 7 for simultaneously shooting four frames is superposed upon the arc-shaped elongated hole 11a of the plate 5 for two frames and is located at the position of the perforation 3a of the support plate 1 so that only the first shooting position is open and the shooting takes place. When the the shutter is released, both the claw members 22, 23 are rotated 90° and displaced in the clockwise direction by means of the return operation of the spring 15 of the return lever 14, and the feed claw engaging holes 8, 12 of both the plates 4, 5 and each of the frame feed claws 25, 26 are disengaged. In this condition, when the shutter is again released, both the plates 4, 5 are rotated 90° and displaced by means of the feed claws 25, 26 of both the claw members 22, 23 which are engaged with the feed claw engaging holes 8, 12 in the clockwise direction through 90°. In this condition, the positions of the perforations 3a, 3c of the support plate are interrupted by means of the plate 5 for two frames, and the position of the perforation 3d of the support plate 1 is interrupted by means of the plate 4 for one frame, and the perforation 7 for simultaneous shooting of four frames is superposed upon the arc-shaped elongated hole 11a of the plate 5 for two frames and is located at the position of the perforation 3b of the support plate 1 so that only the second shooting position is open. By repeating this operation, every time the shutter is released, the third and fourth shooting positions are sequentially opened, making the one frame shooting operation possible.

As described in the foregoing, the frame shooting device for a camera for shooting a plurality of frames simultaneously according to this invention has features such as easy changeover to four frame shooting, two frame shooting and one frame shooting by merely turning a shooting frame selective knob, the changeover being facilitated by means of a cam projection rotatable by the shooting frame selective knob, and a reduced number of component parts and a simple structure, and therefore the practical effects of this invention are extremely great when put into practice.

It is, of course, to be understood that this invention is, by no means, limited to the specific showing in the drawings but also comprises any modifications within the scope of the appended claims.

Consequently, within the scope of the appended claims, the present invention may be practiced otherwise than as specifically described herein.

What is claimed is:

1. A frame shooting device for a camera for shooting a plurality of frames simultaneously, which comprises:

a support plate disposed in the vicinity of a shutter and an iris mechanism within the box of said camera for shooting a plurality of frames simultaneously, and four perforations are bored at an interval of 90° around a pin shaft disposed at the center of said support plate;

a plate for one frame which is rotatably journalled upon said pin shaft of said support plate at its shaft hole and four perforations for shooting four frames simultaneously are bored at positions corresponding to said four perforations of said support plate, and a perforation for shooting one frame is bored at a position between two of said four perforations of said plate for one frame, and four feed claw engaging holes are bored at an interval of 90° in the vicinity of the peripheral edge portion of said plate for one frame;

a plate for two frames comprising a disc which is rotatably journalled upon said pin shaft of said support plate at its shaft hole, and a pair of symmetrical arc-shaped elongated holes, having two adjacent perforations within said support plate serving as hole ends with respect to said elongated holes and forming an arc-shaped locus centered about said shaft hole of said support plate is bored upon said disc, and four feed claw engaging holes are bored at an interval of 90° in the vicinity of the peripheral edge portion of said plate for two frames;

a selective disc which is rotatably journalled and disposed in the vicinity of outer peripheries of both of said plates for one frame and two frames at a corner of said support plate, and is interlockingly rotated and displaced with a frame changeover cam, and is provided, outside of said box of said camera, with a cam projection and an abutting projection upon part of the surface of the peripheral portion of said disc;

a plate feeding means in which base ends, of a claw member for two frame feed formed with a two frame feed claw at its tip for engaging one of said feed claw engaging hole of said plate for two frames, and of a claw member for one frame feed formed with a one frame feed claw at its tip for engaging one of said feed claw engaging holes of said plate for one frame are integrally formed, said base ends are rotatably journalled upon said pin shaft of said support plate, and the rotational drive of said base ends occurs within a maximum 90° beyond a predetermined selected position of said selective disc through the interlocked stroke of said shutter of said camera and a link mechanism; and a control link means in which interlocking of said link mechanism and said shutter and both of said claw members during shooting of said four frames is interrupted by rotation of said selective disc, and wherein said rotational drive of both of said claw members is controlled, whereby a simultaneous shooting, or a single shooting such as a one frame shooting, two frame shooting, and four frame shooting, can be carried out as a result of the rotary setting of said selective disc which is interlocked with said shutter.

2. A frame shooting device for a camera for shooting a plurality of frames simultaneously according to claim 1, in which:

said perforations of said support plate are positioned in the direction of 45° relative to a horizontal plane passing through said pin shaft of said support plate; and a click stop means for stopping said plate for one frame and said plate for two frames at a predetermined position with respect to said support plate is formed upon an outer periphery of said plate for one frame and said plate for two frames.

3. A frame shooting device for camera for shooting a plurality of frames simultaneously according to claim 1 in which the plate for two frames is a disc of smaller diameter than the plate for one frame.

4. A frame shooting device for a camera for shooting a plurality of frames simultaneously according to claim 1, in which:

said base ends of plate like members of said claw member for two frame feed and said claw member for one frame feed interlocked by means of said stroke of said shutter of said camera and said link mechanism are superposed and fixed by said plate feeding means, said base ends are rotatably and pivotally fixed to said pin shaft of said support plate and are pivotable within a maximum angular range of 90° beyond said predetermined selected position of said selective disc; and said two frame feed claw engaging a feed claw engaging hole of said plate for two frames is disposed at the tip of said claw member for two frame feed or a one frame feed claw engaging one of said feed claw engaging holes of said plate for two frames is disposed at the tip of said claw member for one frame feed, and a riding end extends toward said tip of said claw member for one frame feed so as to achieve an interference or non-interference condition with said cam projection of said selective disc, and at the time of said interference, said one frame feed claw is caused to retreat from said feed claw engaging hole.

* * * * *